US012635022B2

(12) United States Patent
Wu et al.

(10) Patent No.: US 12,635,022 B2
(45) Date of Patent: May 19, 2026

(54) METHODS AND APPARATUSES FOR BEAM FAILURE DETECTION AND RECOVERY PROCEDURE IN DEACTIVATED SN CASE

(71) Applicant: LENOVO (BEIJING) LIMITED, Beijing (CN)

(72) Inventors: Lianhai Wu, Beijing (CN); Congchi Zhang, Shanghai (CN); Bingchao Liu, Beijing (CN); Mingzeng Dai, Shanghai (CN); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 312 days.

(21) Appl. No.: 18/261,438

(22) PCT Filed: Jan. 21, 2021

(86) PCT No.: PCT/CN2021/073070
§ 371 (c)(1),
(2) Date: Jul. 13, 2023

(87) PCT Pub. No.: WO2022/155841
PCT Pub. Date: Jul. 28, 2022

(65) Prior Publication Data
US 2024/0073984 A1     Feb. 29, 2024

(51) Int. Cl.
*H04W 76/10*     (2018.01)
*H04W 76/19*     (2018.01)
*H04W 76/30*     (2018.01)

(52) U.S. Cl.
CPC ........... *H04W 76/19* (2018.02); *H04W 76/30* (2018.02)

(58) Field of Classification Search
CPC ..... H04W 16/28; H04W 76/15; H04W 76/19; H04W 76/30; H04W 76/38
See application file for complete search history.

(56) References Cited

U.S. PATENT DOCUMENTS

| 11,082,116 | B1 * | 8/2021 | Kung | ..................... | H04W 76/19 |
| 11,705,956 | B2 * | 7/2023 | Dong | ..................... | H04W 76/19 |
| | | | | | 370/329 |

(Continued)

FOREIGN PATENT DOCUMENTS

WO     2020258279 A1     12/2020

OTHER PUBLICATIONS

International Searching Authority, "Written Opinion of the International Searching Authority," PCT/CN2021/073070, Oct. 21, 2021, pp. 1-4.

(Continued)

*Primary Examiner* — Frank Duong
(74) *Attorney, Agent, or Firm* — Kunzler, Needham & Hilton

(57)     ABSTRACT

Embodiments of the present application relate to methods and apparatuses for a beam failure detection and recovery procedure in a deactivated secondary node (SN) case in a multi-radio dual connectivity (MR-DC) scenario under a 3rd Generation Partnership Project (3GPP) 5G system or the like. According to an embodiment of the present application, a method can include: receiving configuration information relating to at least one of a beam failure detection (BFD) procedure and a beam failure recovery (BFR) procedure; and receiving a deactivation indication associated with a SN of the UE, or determining an expiry of a timer associated with deactivating the SN of the UE, wherein the deactivation indication is included in at least one of: a radio resource control (RRC) message; and a deactivation medium access control (MAC) control element (CE).

18 Claims, 3 Drawing Sheets

(56) References Cited

U.S. PATENT DOCUMENTS

| | | | | |
|---|---|---|---|---|
| 12,184,476 | B2 * | 12/2024 | Luo | H04L 5/0048 |
| 2019/0090227 | A1 | 3/2019 | Tsai et al. | |
| 2019/0274098 | A1 | 9/2019 | Cheng et al. | |
| 2020/0100311 | A1 | 3/2020 | Cirik et al. | |
| 2020/0267797 | A1 * | 8/2020 | Wei | H04B 7/06964 |
| 2020/0344834 | A1 | 10/2020 | Harada et al. | |
| 2020/0383167 | A1 * | 12/2020 | Sengupta | H04B 7/06964 |
| 2020/0389222 | A1 | 12/2020 | Wu et al. | |
| 2021/0105176 | A1 * | 4/2021 | Tsai | H04B 7/06964 |
| 2021/0337616 | A1 * | 10/2021 | Zhang | H04W 36/305 |
| 2022/0085862 | A1 * | 3/2022 | Kung | H04W 76/19 |
| 2023/0189098 | A1 * | 6/2023 | Wu | H04W 76/15 |
| | | | | 370/331 |
| 2023/0337020 | A1 * | 10/2023 | Da Silva | H04B 7/06964 |

OTHER PUBLICATIONS

Samsung, "Offline Discussion 112: Beam Management Enhancements", 3GPP TSG-RAN WG2 Meeting#109e R2-2001685, Mar. 6-24, 2020, pp. 1-12.

CATT, "Efficient Activation/Deactivation Mechanism for SCG", 3GPP TSG-RAN WG2 Meeting #112 electronic R2-2009357, Nov. 2-13, 2020, pp. 1-4.

Ericsson, "Efficient SCG (de)activation", 3GPP TSG-RAN WG2 #112e Tdoc R2-2010062, Nov. 2-13, 2020, pp. 1-13.

Huawei, "[Post111-e][919][eDCCA] Efficient activation deactivation of SCG Discussion on SCG deactivation and activation", 3GPP TSG-RAN WG2#112-e R2-2010123, Nov. 2-13, 2020, pp. 1-20.

Huawei et al., "Discussion on SCG deactivation and activation", 3GPP TSG-RAN WG2 Meeting #112-e R2-2010124, Nov. 2-13, 2020, pp. 1-6.

* cited by examiner

| $C_7$ | $C_6$ | $C_5$ | $C_4$ | $C_3$ | $C_2$ | $C_1$ | SP |
|---|---|---|---|---|---|---|---|
| AC | R | Candidate RS ID or R bits | | | | | |

...

| AC | R | Candidate RS ID or R bits |
|---|---|---|

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | Candidate RS ID or R bits | | | | | |

...

| AC | R | Candidate RS ID or R bits |
|---|---|---| receiving configuration information relating to at least one of a BFD procedure and a BFR procedure      501 receiving a deactivation indication associated with a SN of the UE, or determining an expiry of a timer associated with deactivating the SN of the UE, wherein the deactivation indication is included in at least one of: a RRC message; and a deactivation MAC CE      502

METHODS AND APPARATUSES FOR BEAM FAILURE DETECTION AND RECOVERY PROCEDURE IN DEACTIVATED SN CASE

TECHNICAL FIELD

Embodiments of the present application generally relate to wireless communication technology, especially to methods and apparatuses for a beam failure detection and recovery procedure in a deactivated secondary node (SN) case in a multi-radio dual connectivity (MR-DC) scenario.

BACKGROUND

Next generation radio access network (NG-RAN) supports a MR-DC scenario. In a MR-DC scenario, a user equipment (UE) with multiple transceivers may be configured to utilize resources provided by two different nodes connected via non-ideal backhauls. Wherein one node may provide new radio (NR) access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, a Xn interface as specified in 3rd Generation Partnership Project (3GPP) standard documents), and at least the MN is connected to the core network.

In general, there are three types of states defined for a SN in a MR-DC scenario, i.e., an activated state, a deactivated state, and a dormant state. In some cases, a deactivated state and a dormant state refer to the same state of a SN. Currently, details regarding a beam failure detection and recovery procedure in a deactivated SN case in a MR-DC scenario have not been discussed in 3GPP 5G technology yet.

SUMMARY

Some embodiments of the present application provide a method for wireless communications. The method may be performed by a UE. The method includes: receiving configuration information relating to at least one of a beam failure detection (BFD) procedure and a beam failure recovery (BFR) procedure; and receiving a deactivation indication associated with a secondary node (SN) of the UE, or determining an expiry of a timer associated with deactivating the SN of the UE, wherein the deactivation indication is included in at least one of: a radio resource control (RRC) message; and a deactivation medium access control (MAC) control element (CE).

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
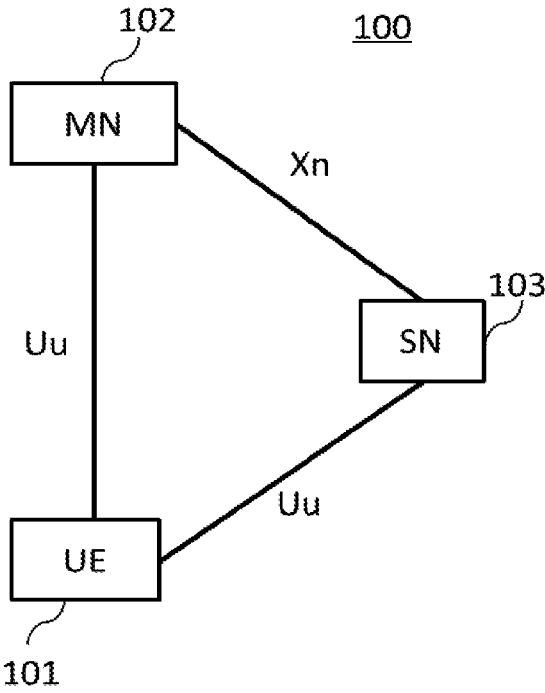
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB.

MN 102 may be associated with a master cell group (MCG). The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a secondary cell group (SCG). The SCG may refer to a group of serving cells associated with SN 103, and may include a primary secondary cell (PSCell) and optionally one or more SCells. The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 2:
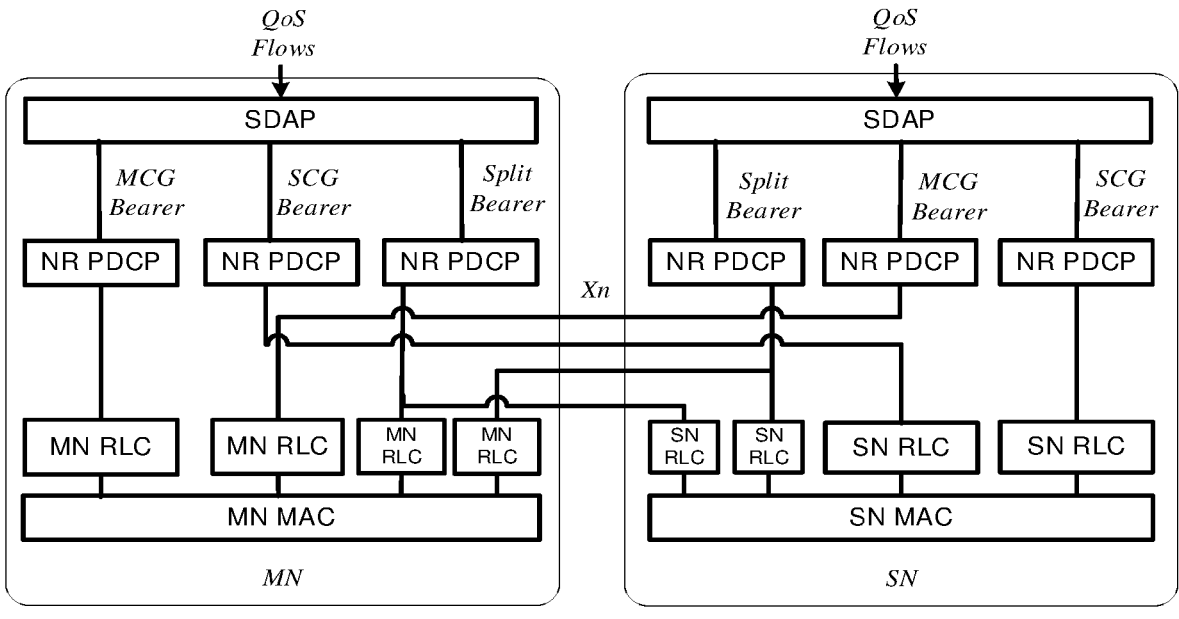
FIG. 2 illustrates a network side protocol termination options for MCG, SCG and split bearers in a MR-DC scenario with 5GC (NGEN-DC, NE-DC and NR-DC) in accordance with 3GPP standard document TS37.340.

From a perspective of a network, each bearer (a MCG bearer, a SCG bearer, and a split bearer) can be terminated either in a MN or in a SN. As specified in 3GPP standard document TS37.340, network side protocol termination options are shown in FIG. 2 for a MR-DC with 5GC (NGEN-DC, NE-DC and NR-DC). In general, a radio bearer configured with a service data adaptation protocol (SDAP) and a packet data convergence protocol (PDCP) entity located in the MN or the SN is considered as "a MN terminated radio bearer" or "a SN terminated radio bearer". A radio bearer configured with a radio link control (RLC) and a medium access control (MAC) entity located in MN or SN is considered as a MCG bearer or a SCG bearer. Thus, there are six types of radio bearers which can be configured in a MR-DC scenario: (1) a SN terminated MCG bearer; (2) a SN terminated SCG bearer; (3) a MN terminated MCG bearer; (4) a MN terminated SCG bearer; (5) a MN terminated split bearer; and (6) a SN terminated split bearer.

FIG. 2 illustrates a network side protocol termination options for MCG, SCG and split bearers in a MR-DC scenario with 5GC (NGEN-DC, NE-DC and NR-DC) in accordance with 3GPP standard document TS37.340. As shown in FIG. 2, there are six types of radio bearers which can be configured in a MR-DC scenario for a 5GC (5G core network) case:

(1) MN terminated MCG bearer, with SDAP and PDCP, RLC, and MAC located at MN.

(2) MN terminated SCG bearer, with SDAP and PDCP located at MN while RLC and MAC located at SN.

(3) MN terminated split bearer, with SDAP and PDCP located at MN while one RLC leg at MN and another RLC leg at SN.

(4) SN terminated split bearer, with (SDAP and) PDCP located at SN while one RLC leg at MN and another RLC leg at SN (5) SN terminated MCG bearer, with SDAP and PDCP located at SN while RLC and MAC located at MN.

(6) SN terminated SCG bearer, with SDAP and PDCP, RLC, and MAC located at SN.

In general, agreements of 3GPP standard documents regarding a SN activation procedure or a SN deactivation procedure are as follows. To enable reasonable UE battery consumption when carrier aggregation (CA) is configured, an activation/deactivation mechanism of Cells is supported. When a SN is deactivated, a UE does not need to receive the corresponding physical downlink control channel (PDCCH) or physical downlink shared channel (PDSCH), cannot transmit in the corresponding uplink, nor is it required to perform channel quality indicator (CQI) measurements. Conversely, when a SN is active, the UE shall receive PDSCH and PDCCH (if the UE is configured to monitor PDCCH from this SN) and is expected to be able to perform CQI measurements.

As specified in 3GPP Release 17 Work Item on NR support of efficient SN activation or deactivation procedure in a MR-DC scenario, in EN-DC deployment, power consumptions of a UE and a network is a big issue, due to simultaneously maintaining two radio links. In some cases, a NR UE's power consumption is 3 to 4 times higher than a LTE UE's power consumption. In EN-DC deployment, a MN provides the basic coverage. When a UE's data rate requirement changes dynamically, e.g., from high to low, a SN is worth considering to be (de)activated to save energy consumptions of the network and the UE.

A SN (de)activation procedure can be triggered by a MN, a SN, or a UE. There are following three options to activate and deactivate the SN.

Option 1: a SN may be activated or deactivated upon SCell configuration. In Option 1, on one hand, a MN may configure a UE to set a SN's state in SN relevant configuration information in the UE as an activated or deactivated state, and then, the MN informs the SN. On the other hand, a SN may configure a UE. In particular, if SRB3 is configured, the SN transmits (de)activation indication to the UE directly; and if SRB3 is not configured and if the SN transmits an (de)activation indication to the UE for setting a SN's state in SN relevant configuration information in the UE as an activated state, the SN needs to transmit RRC Reconfiguration message contained in the DLInformationTransferMRDC message via the MN.

Option 2: a SN may be activated or deactivated via a SN activation or deactivation MAC CE. A SN activation MAC CE is only transmitted by a MN. A SN deactivation MAC CE can be transmitted by a MN and a SN.

Option 3: a SN may be deactivated upon an expiry of a timer for a deactivated or dormant SN.

Currently, more details regarding a beam failure detection and recovery procedure in a deactivated SN case in a MR-DC scenario are unclear, and specific enhanced mechanisms for beam failure detection (BFD) and beam failure recovery (BFR) are needed in an efficient way. Embodiments of the present application provide enhanced mechanisms for BFD and BFR to support a SCG deactivation case in a MR-DC scenario in 3GPP 5G system or the like in an efficient way.

Specifically, some embodiments of the present application handle an ongoing or triggered BFR MAC CE when a UE receives a RRC message or a MAC CE to deactivate a SN of the UE or when a timer associated with deactivating the SN of the UE expires. Some further embodiments of the present application handle an ongoing or triggered RA procedure on a PSCell for a BFR purpose when a UE receives a RRC message or a MAC CE to deactivate the SN of the UE or when a timer associated with deactivating the SN of the UE expires. Some other embodiments of the present application provide solutions relating to a UE's new behaviour(s) associated with BFD and BFR procedures when the SN of the UE is in the deactivated state.

More details regarding embodiments of the present application will be illustrated in the following text in combination with the appended drawings. Following definitions are assumed in the embodiments of the present application:

Fast MCG link recovery: in a MR-DC scenario, a RRC procedure where the UE sends an MCG Failure Information message to the MN via the SCG upon the detection of a radio link failure on the MCG.

Master Cell Group: in a MR-DC scenario, a group of serving cells associated with the Master Node, comprising of the SpCell (PCell) and optionally one or more SCells.

Secondary Cell Group: in a MR-DC scenario, a group of serving cells associated with the Secondary Node, comprising of the SpCell (PSCell) and optionally one or more SCells.

Secondary node: in a MR-DC scenario, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

SCG bearer: in a MR-DC scenario, a radio bearer with an RLC bearer (or two RLC bearers, in case of CA packet duplication in an E-UTRAN cell group, or up to four RLC bearers in case of CA packet duplication in a NR cell group) only in the SCG.

SpCell: a primary cell of a master or secondary cell group. signaling radio bearer (SRB) 3: in EN-DC, NGEN-DC and NR-DC, a direct SRB between the SN and the UE.

Split bearer: in a MR-DC scenario, a radio bearer with RLC bearers both in MCG and SCG.

As specified in 3GPP standard document TS38.321, regarding a beam failure detection and recovery procedure, a MAC entity may be configured by RRC per a serving cell with a beam failure detection (BFD) procedure which is used for indicating to the serving BS of a new SSB or CSI-RS when beam failure is detected on the serving SSB(s) or CSI-RS(s). A beam failure is detected by counting a beam failure instance indication from the lower layers to the MAC entity. RRC configures the following parameters in the BeamFailureRecoveryConfig and the RadioLinkMonitoringConfig for the beam failure detection and recovery procedure:

beamFailureInstanceMaxCount for the beam failure detection;

BFI_COUNTER (per Serving Cell): counter for beam failure instance indication which is initially set to 0.

beamFailureDetectionTimer for BFD.

According to agreements of 3GPP standard document TS38.321, for a BFR procedure for a SCell, if a beam failure instance indication has been received from a physical layer, a UE starts or restarts the beamFailureDetectionTimer and increment BFI_COUNTER by 1. If BFI_COUNTER>=beamFailureInstanceMaxCount and the serving cell is a SCell, the UE triggers a BFR procedure for this serving cell. The UE will transmit a BFR MAC CE to the serving BS.

Figures 3, 4:
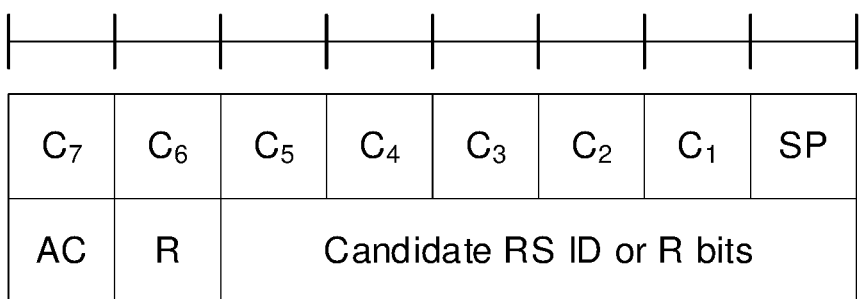
FIGS. 3 and 4 illustrate two exemplary format diagrams of a BFR MAC CE in accordance with 3GPP standard document TS38.321.

FIGS. 3 and 4 illustrate two exemplary format diagrams of a BFR MAC CE in accordance with 3GPP standard document TS38.321. In the embodiments of FIGS. 3 and 4, fields in a BFR MAC CE are defined as follows:

SP (e.g., "SP" as shown in the eighth column, the first row of FIGS. 3 and 4, respectively): this field indicates beam failure detection for the SpCell of this MAC entity. The SP field is set to 1 to indicate that beam failure is detected for a SpCell only when a BFR MAC CE is to be included into a MAC PDU as a part of a random access (RA) procedure; otherwise, the SP field is set to 0.

$C_i$(BFR MAC CE) (e.g., "$C_1$" to "$C_7$" as shown in FIG. 3; and "$C_1$" to "$C_{31}$" as shown in FIG. 4): this field indicates BFD and the presence of an octet containing the AC field for the SCell with ServCellIndex i as specified in 3GPP standard document TS38.331. The $C_i$ field set to 1 indicates that beam failure is detected and the octet containing the AC field is presented for the SCell with ServCellIndex i. The $C_i$ field set to 0 indicates that the beam failure is not detected and octet containing the AC field is not presented for the SCell with ServCellIndex i. The octets containing the AC field are present in an ascending order based on the ServCellIndex.

AC (e.g., "AC" as shown in the first column, the second row to the bottom row of FIG. 3; and "AC" as shown in the first column, the fifth row to the bottom row of FIG. 4): this field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, the AC field is set to 0. If the AC field set to 1, the Candidate RS ID field is present. If the AC field set to 0, R bits are present instead.

Candidate RS ID (e.g., "Candidate RS ID" as shown in the second row to the bottom row of FIG. 3; and "Candidate RS ID" as shown in the fifth row to the bottom row of FIG. 4): this field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. Index of an SSB or CSI-RS is the index of an entry in candidateBeamRSSCellList corresponding to the SSB or CSI-RS. Index 0 corresponds to the first entry in candidateBeamRSSCellList, and index 1 corresponds to the second entry in the list and so on. The length of this field is 6 bits.

R (e.g., "R" as shown in the second row to the bottom row of FIG. 3; and "R" as shown in the fifth row to the bottom row of FIG. 4): this field is a reserved bit, and it is set to 0.

According to agreements of 3GPP standard document TS38.321, for BFR for a PSCell, if a beam failure instance indication has been received from a physical layer, a UE starts or restarts the beamFailureDetectionTimer and increment BFI_COUNTER by 1. If BFI_COUNTER>=beamFailureInstanceMaxCount and the serving cell is a PSCell or a PCell, the UE triggers a RA procedure on the SpCell. The UE selects a suitable beam to perform a BFR procedure (if the BS has provided dedicated RA resources for certain beams, those will be prioritized by the UE). Upon completing the RA procedure, the BFR procedure is considered as complete.

Figure 5:
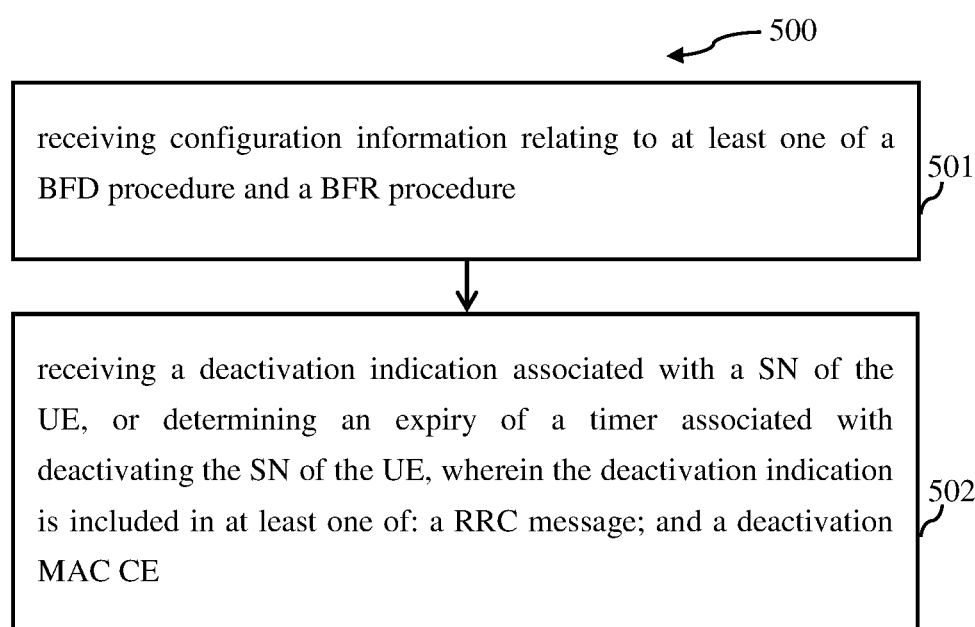
FIG. 5 illustrates a flow chart of a method for deactivating a SN of a UE in accordance with some embodiments of the present application.

FIG. 5 illustrates a flow chart of a method for deactivating a SN of a UE in accordance with some embodiments of the present application.

The exemplary method 500 in the embodiments of FIG. 5 may be performed by a UE, e.g., UE 101 as shown and illustrated in FIG. 1. Although described with respect to a UE, it should be understood that other device(s) may be configured to perform the method as shown and illustrated in FIG. 5. The embodiments of FIG. 5 assume that a MN and a SN in a MR-DC scenario in these embodiments may be combined in any one of EN-DC, NGEN-DC, NE-DC, and NR-DC scenarios.

In the exemplary method 500 as shown in FIG. 5, in operation 501, a UE receives configuration information relating to at least one of a BFD procedure and BFR procedure. In operation 502, the UE receives a deactivation indication associated with a SN of the UE, or determines an expiry of a timer associated with deactivating the SN of the UE. The deactivation indication may be included in a RRC message and/or a deactivation MAC CE. For instance, the RRC message may be a RRCreconfiguration message as specified in 3GPP standard documents. The timer associated with deactivating the SN of the UE may be named as sNodeDeactivationTimer. A deactivation MAC CE may also be named as a MAC CE for deactivation, a dormancy MAC CE, a MAC CE for dormancy, a dormant MAC CE, or the like.

According to some embodiments, if the UE receives the deactivation indication or determines the expiry of the timer associated with deactivating the SN of the UE and if the BFR procedure for a secondary cell (SCell) has been triggered, the UE cancels the BFR procedure for the SCell.

According to some further embodiments, if the UE receives the deactivation indication or determines the expiry of the timer associated with deactivating the SN of the UE and if the BFR procedure for a SCell has been triggered, the UE suspends a BFR MAC CE associated with the SN of the UE.

In an embodiment, if the SN of the UE (i.e., a SN state in SN relevant configuration information in the UE) is in an activated state, the UE transmits, to a SN, a BFR MAC CE including the latest beam information.

In some additional embodiments, if the UE receives the deactivation indication or determines the expiry of the timer associated with deactivating the SN of the UE and if the BFR procedure for a SCell has been triggered, the UE configures the SN of the UE as a deactivated state; and the UE transmits a BFR MAC CE for a SCell to a MN via a link between the MN and the UE. A beam failure has been detected in the SCell. For example, the BFR MAC CE includes an updated beam for a primary secondary cell (PSCell).

In an embodiment, after receiving BFR MAC CE for the SCell from the UE, the MN forwards, to a SN, the received BFR MAC CE and a time stamp of receiving the BFR MAC CE.

In some other embodiments, if the UE receives the deactivation indication or determines the expiry of the timer associated with deactivating the SN of the UE and if a random access (RA) procedure on a PSCell relating to the BFR procedure is ongoing, the UE configures the SN of the UE as a deactivated state; and the UE transmits, to a MN, a BFR MAC CE for the PSCell via a link between the MN and the UE. A beam failure has been detected in the PSCell. For example, the BFR MAC CE includes an updated beam for the PSCell.

In yet some other embodiments, if the UE receives the deactivation indication or determines the expiry of the timer associated with deactivating the SN of the UE and if a RA procedure on a PSCell relating to the BFR procedure is ongoing, the UE stops the RA procedure on the PSCell.

In yet some other embodiments, if the UE receives the deactivation indication or determines the expiry of the timer associated with deactivating the SN of the UE and if a RA procedure on a PSCell relating to the BFR procedure is ongoing, the UE skips the deactivation indication and continues to perform the RA procedure on the PSCell. In an embodiment, the UE transmits information to a MN, to indicate that the deactivation indication has been skipped. In a further embodiment, if a SN receives information during the RA procedure from the UE, the SN transmits, to a MN, information indicating that the deactivation indication has been skipped.

In yet some other embodiments, if the UE determines the expiry of the timer associated with deactivating the SN of the UE and if a RA procedure on a PSCell relating to the BFR procedure is ongoing, the UE continues to keep the SN of the UE as an activated state and transmits information indicating the expiry of the abovementioned timer.

In yet some other embodiments, if the UE receives the deactivation indication and if a RA procedure on a PSCell relating to the BFR procedure is ongoing, the UE suspends the deactivation indication and continues to perform the RA procedure. In an embodiment, if the RA procedure is successfully completed, the UE autonomously configures the SN of the UE as a deactivated state.

In some additional embodiments, if the UE detects a beam failure and if the SN of the UE is in a deactivated state, the UE may perform at least one of the following:

(1) suspending the BFR procedure for a SCell;

(2) suspending a RA procedure on a PSCell; and (3) configuring the SN of the UE as a deactivated state.

In these embodiments, if the SN of the UE is configured as an activated state, the UE performs the BFR procedure for the SCell and performs the RA procedure on the PSCell. In these embodiments, if the UE detects a beam failure for the PSCell, the RA procedure on the PSCell is performed prior to the BFR procedure for the SCell.

In yet some additional embodiments, if the SN of the UE is in a deactivated state and if the UE detects a beam failure for a PSCell or a SCell, the UE transmits an updated BFR MAC CE to a MN via a link between the MN and the UE. In particular, the MN may forward the updated BFR MAC CE to a SN.

In yet some additional embodiments, if the UE receives the deactivation indication or determines the expiry of the timer associated with deactivating the SN of the UE, the UE sets a value of a beam failure instance counter (e.g., BFI_COUNTER) as zero and stops a beam failure detecting timer (e.g., beamFailureDetectionTimer).

In yet some additional embodiments, after the SN of the UE is configured as a deactivated state, the BFD procedure and the BFR procedure are performed in a PSCell, and the BFD procedure and the BFR procedure are not performed in a SCell.

In yet some additional embodiments, if the timer associated with deactivating the SN of the UE is running, if the UE receives a RRC message or a deactivation MAC CE which includes a deactivation indication, the UE stops the timer associated with deactivating the SN of the UE.

The following texts describe specific Embodiments 1-3 of the method as shown and illustrated in FIG. 5.

According to Embodiments 1-3, a UE and a BS (e.g., a MN or a SN) may perform following operations. The UE may be UE 101 as shown and illustrated in FIG. 1. The MN may be MN 102 as shown and illustrated in FIG. 1. The SN may be SN 103 as shown and illustrated in FIG. 1.

Embodiment 1: this embodiment handles an ongoing or triggered BFR MAC CE when a UE receives a RRC message (e.g., a RRCreconfiguration message) or a MAC CE to deactivate the SN of the UE or when a timer associated with deactivating the SN of the UE (e.g., sNodeDeactivationTimer) expires. In particular, in Case A-1 of Embodiment 1, a BFR MAC CE can be skipped for the UE when the SN of the UE is in a deactivated state. In Case A-2 of Embodiment 1, a BFR MAC CE should be done for the UE when the SN of the UE is in a deactivated state.

(1) Step 1: A UE accesses a BS. A SN is configured to the UE.

The parameters for BFD and BFR (e.g., BeamFailureRecoveryConfig and RadioLinkMonitoringConfig) are configured to the UE.

(2) Step 2: The UE triggers a BFR MAC CE for a SCell. For example, the UE triggers a BFR procedure for one SCell when COUNTER>=beamFailureInstanceMaxCount. After triggering the BFR procedure, the UE will generate a BFR MAC CE for transmission using any available serving cell associated with the SN configured to the UE.

(3) Step 3: Before transmitting the BFR MAC CE, the UE may receive a deactivation indication from a MN or the SN, or a timer associated with deactivating the SN of the UE (e.g., sNodeDeactivationTimer) may expire.

The deactivation indication received from the MN or the SN is for deactivating the SN of the UE (i.e., a SN state in SN relevant configuration information in the UE) and could be included in a RRC message (e.g., a RRCreconfiguration message) or a MAC CE.

(4) Step 4: The UE may adopt Case A-1 or Case A-2 of Embodiment 1 according to different scenarios or implementations.

1. Case A-1: a BFR MAC CE can be skipped for the UE when the SN of the UE is in the deactivated state. Specifically, in Step 4, the UE shall go to Option 1 or Option 2 as follows:

Option 1: The UE cancels the triggered BFR procedure for any SCell when the UE receives the RRC message (e.g., the RRCreconfiguration message) or the MAC CE to deactivate the SN of the UE or when the timer associated with deactivating the SN of the UE (e.g., sNodeDeactivationTimer) expires.

If a SN state in SN relevant configuration information in the UE (i.e., the SN of the UE) is configured as deactivated, the UE may set all beam failure instance counter(s) (e.g., BFI_COUNTER) to 0 and stops all a beam failure detecting timer (e.g., beamFailureDetectionTimer).

Option 2: The UE suspends the BFR MAC CE associated with the SN when the UE receives the RRC message (e.g., the RRCreconfiguration message) or the MAC CE to deactivate the SN of the UE or when the timer associated with deactivating the SN of the UE (e.g., sNodeDeactivationTimer) expires. When the SN of the UE is in an activated state, the UE transmits a pending BFR MAC CE including the latest new beam(s).

For instance, the latest new beam(s) in the pending BFR MAC CE is a "good" beam upon activating the SN of the UE.

In particular, the pending BFR MAC CE may have the following formats: with reference to the embodiments of any of FIGS. 3 and 4, the "SP" field may be used to carry an identity (ID) of a PSCell, and the $C_i$ field may be used to carry an ID of a SCell.

If the SN state in SN relevant configuration information in the UE is configured as deactivated, the UE may set all beam failure instance counter(s) (e.g., BFI_COUNTER) to 0 and stops all beam failure detecting timer(s) (e.g., beamFailureDetectionTimer).

2. Case A-2: a BFR MAC CE should be done for the UE when the SN of the UE is in the deactivated state. Specifically, in Step 4, the UE shall go to Option (1) as follows:

Option (1): After the UE receives the deactivation indication or determines the expiry of the timer associated with deactivating the SN of the UE and after the BFR procedure for the SCell is triggered, the UE configures the SN of the UE as a deactivated state. Then, the UE transmits, to a MN, a BFR MAC CE for the SCell in which a beam failure is detected using a MN link when the SN of the UE is in a deactivated state. The MN may transmit new beam information to the SN.

In one example, the UE transmits, to the MN, a new enhanced BFR MAC CE which includes a new beam for a PSCell. With reference to the embodiments of any of FIGS. 3 and 4, the "SP" field of the new enhanced BFR MAC CE may be used to carry an ID of the PSCell.

In a further example, when the MN transmits the information included in the BFR MAC CE (e.g., the new enhanced BFR MAC CE) to the SN, e.g., via a Xn interface, the MN also transmits a time stamp of receiving the BFR MAC CE from the UE. Then, the SN can be aware whether the UE has applied this new beam or not.

Embodiment 2: this embodiment handles an ongoing or triggered RA procedure on a PSCell for a BFR purpose when a UE receives a RRC message (e.g., a RRCreconfiguration message) or a MAC CE to deactivate the SN of the UE or when a timer associated with deactivating the SN of the UE (e.g., sNodeDeactivationTimer) expires. In particular, in Case B-1 of Embodiment 2, the RA procedure on the PSCell for a BFR purpose can be skipped for the UE when the SN of the UE is in a deactivated state. In Case B-2 of Embodiment 2, the RA procedure on the PSCell for a BFR purpose should be done for the UE when the SN of the UE is in a deactivated state.

(1) Step 1: A UE accesses a BS. A SN is configured to the UE.

The parameters for BFD and BFR (e.g., BeamFailureRecoveryConfig and RadioLinkMonitoringConfig) are configured to the UE.

(2) Step 2: The UE triggers a RA procedure on a PSCell for a BFR purpose.

In an example, if BFI_COUNTER>=beamFailureInstanceMaxCount and the serving cell is a PSCell, the UE triggers a RA procedure on the PSCell.

In a further example, BFD and BFR procedures are only performed in a PSCell when the SN of the UE is in a deactivated state. BFD and BFR procedures are not performed in a SCell when the SN of the UE is in a deactivated state.

(3) Step 3: Before the UE transmits the preamble during the ongoing or triggered RA procedure, the UE may receive a deactivation indication from a MN or the SN, or a timer associated with deactivating the SN of the UE (e.g., sNodeDeactivationTimer) may expire.

The deactivation indication received from the MN or the SN could be included in a RRC message or a MAC CE.

(4) Step 4: The UE may adopt Case B-1 or Case B-2 of Embodiment 2 according to different scenarios or implementations.

1. Case B-1: The ongoing or triggered RA procedure can be skipped for the UE when the SN of the UE is in the deactivated state. Specifically, in Step 4, the UE shall go to Option (A) or Option (B) as follows:

Option (A): If there is an ongoing or triggered RA procedure on a PSCell (in which a beam failure has been detected) for a BFR purpose, the UE may stop the RA procedure when the UE receives the RRCreconfiguration message or the MAC CE to deactivate the SN of the UE or when sNodeDeactivationTimer expires. The UE performs the RA procedure firstly when the SN of the UE is in an activated state.

Option (B): If there is an ongoing or triggered RA procedure on a PSCell for a BFR purpose, after the UE receives the deactivation indication or determines the expiry of the timer associated with deactivating the SN of the UE, the UE configures the SN of the UE as a deactivated state. That is, the UE sets SN state in SN relevant configuration information in the UE as deactivated. Then, the UE transmits a BFR MAC CE for the PSCell to the MN via a link between the MN and the UE.

In one example, the UE transmits, to the MN, a new enhanced BFR MAC CE which includes a new beam for the PSCell. With reference to the embodiments of any of FIGS. 3 and 4, the "SP" field of the new enhanced BFR MAC CE may be used to carry an ID of the PSCell.

In a further example, the BFR MAC CE includes an updated beam for the PSCell.

2. Case B-2: The ongoing or triggered RA procedure should be done for the UE when the SN of the UE is in the deactivated state. Specifically, in Step 4, the UE shall go to Option (a), Option (b), or Option (c) as follows:

Option (a) (associated with a deactivation indication included in a RRC message and a MAC CE):

If there is an ongoing or triggered RA procedure on a PSCell for a BFR purpose and the UE receives a RRC message (e.g., a RRCreconfiguration message) or a MAC CE including a deactivation indication, the UE may skip the deactivation indication in the RRC message or the MAC CE. The BS may configure the UE to deactivate the SN as a deactivated state after the RA procedure is successfully completed.

If the UE skips the deactivation indication received from the MN, the SN needs to indicate to the MN when the SN receives information during the RA procedure of the UE. Alternatively, the UE can indicate to the MN that the UE has skipped the deactivation indication.

Option (b) (associated with a timer associated with deactivating the SN of the UE):

If there is an ongoing or triggered RA procedure on a PSCell for a BFR purpose and a timer associated with deactivating the SN of the UE (e.g., sNodeDeactivationTimer) expires, the UE may not stop the ongoing RA procedure and the UE may report an expiry of the timer. In particular, for example, the UE continues to keep the SN of the UE as an activated state and transmits information indicating the expiry of the timer. The BS may configure the UE to deactivate the SN as a deactivated state after the RA procedure is successfully completed.

In one example, the UE may restart the timer associated with deactivating the SN of the UE (e.g., sNodeDeactivationTimer), because the UE may receive or transmit the data.

In a further example, the UE may trigger the RA procedure at the time when sNodeDeactivationTimer expires. Then, the UE continues the RA procedure and does not deactivate the SN of the UE.

In another example, when the UE receives the RRC message or the MAC CE to deactivate the SN of the UE, the UE shall stop sNodeDeactivationTimer if this timer is running.

Option (c): If there is an ongoing or triggered RA procedure on a PSCell for a BFR purpose and the UE receives a RRC message (e.g., a RRCreconfiguration message) or a MAC CE which includes a deactivation indication, the UE may continue the ongoing RA procedure and suspends the deactivation indication in the RRC message or the MAC CE. The UE autonomously deactivates the SN (i.e., autonomously setting the SN state in SN relevant configuration information in the UE as deactivated) after the RA procedure is successfully completed. If a timer associated with deactivating the SN of the UE (e.g., sNodeDeactivationTimer) expires, the UE autonomously deactivates the SN after the RA procedure is successfully completed.

Embodiment 3: this embodiment defines a UE's behavior(s) when the SN of the UE is in the deactivated state. In particular, in Case C-1 of Embodiment 3, a BFD procedure is needed, but a BFR procedure is not needed when the SN of the UE is in the deactivated state. In Case C-2 of Embodiment 3, both BFD and BFR procedures are needed when the SN of the UE is in the deactivated state. In Case C-3 of Embodiment 3, both BFD and BFR procedures are not needed when the SN of the UE is in the deactivated state.

(1) Step 1: A UE accesses a BS. A SN is configured to the UE.

The parameters for BFD and BFR (e.g., BeamFailur-eRecoveryConfig and RadioLinkMonitoringConfig) are configured to the UE.

(2) Step 2: The UE may receive a deactivation indication from a MN or the SN, or a timer associated with deactivating the SN of the UE (e.g., sNodeDeactiva-tionTimer) may expire.

The deactivation indication received from the MN or the SN could be included in a RRC message or a MAC CE.

(3) Step 3: the UE may adopt Case C-1, Case C-2, or Case C-3 of Embodiment 3 according to different scenarios or implementations.

1. Case C-1: A BFD procedure is needed, but a BFR procedure is not needed when the SN of the UE is in the deactivated state. In particular, in Step 3, if a beam failure is detected and if the SN of the UE is in a deactivated state, the UE may suspend the BFR procedure for a SCell, suspend a RA procedure on a PSCell for a BFR purpose, and/or configure the SN of the UE as a deactivated state. When the SN of the UE is in an activated state, the UE may perform the BFR procedure for the SCell and the RA procedure on the PSCell for a BFR purpose. The RA procedure on the PSCell for a BFR purpose may be performed firstly if a beam failure is detected for the PSCell.

2. Case C-2: Both BFD and BFR procedures are needed when the SN of the UE is in the deactivated state. In particular, in Step 3, if the SN of the UE is in a deactivated state and the UE detects a beam failure for one of a PSCell and a SCell, the UE transmits an updated BFR MAC CE (e.g., a new enhanced BFR MAC CE) to the MN using a MN link if a beam failure for a PSCell or a SCell is detected. Then, the MN transmits new beam information to the SN.

In one example, the UE transmits, to the MN, a new enhanced BFR MAC CE which includes a new beam for the PSCell. With reference to the embodiments of any of FIGS. 3 and 4, the "SP" field of the new enhanced BFR MAC CE may be used to carry an ID of the PSCell.

In a further example, when the MN transmits the information included in the updated BFR MAC CE (e.g., the new enhanced BFR MAC CE) to the SN, the MN also transmits a time stamp of receiv-ing the updated BFR MAC CE. Then, the SN can be aware whether the UE has applied this new beam or not.

In another example, the UE performs a RA proce-dure directly when detecting a beam failure for the PSCell or the SCell.

3. Case C-3: Both BFD and BFR procedures are not needed when the SN of the UE is in the deactivated state. In particular, in Step 3, if the UE receives a deactivation indication or determines an expiry of a timer associated with deactivating the SN of the UE, the UE sets a beam failure instance counter (e.g., BFI_COUNTER) to 0 and stops a beam failure detecting timer (e.g., BeamFailureDetectionTimer).

Details described in all other embodiments of the present application (for example, details of a deactivation indication or a timer associated with deactivating the SN of the UE) are applicable for the embodiments of FIG. 5. Moreover, details described in the embodiments of FIG. 5 are applicable for all the embodiments of FIGS. 1-4 and 6.

Figure 6:
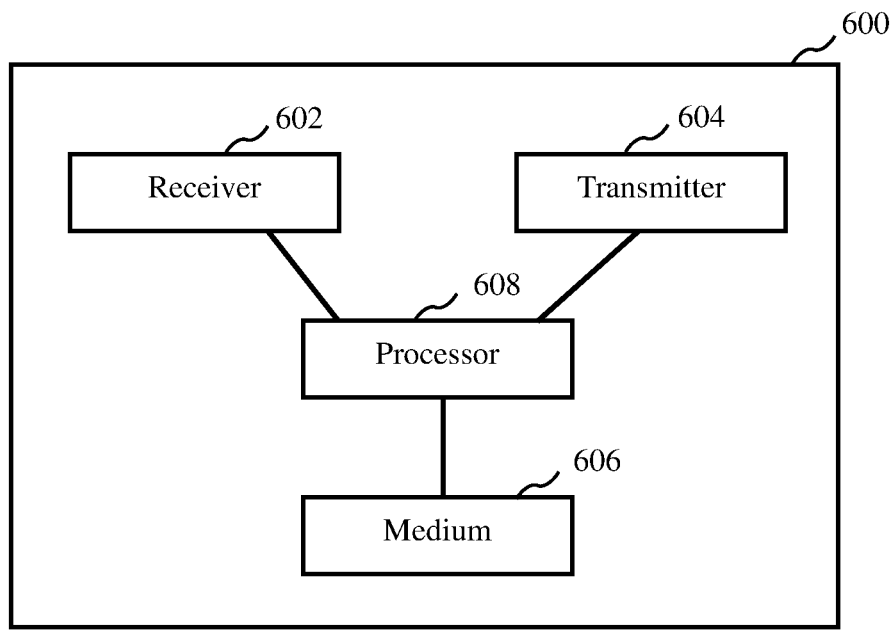
FIG. 6 illustrates an exemplary block diagram of an apparatus in accordance with some embodiments of the present application.

FIG. 6 illustrates an exemplary block diagram of an apparatus in accordance with some embodiments of the present application. In some embodiments of the present application, the apparatus 600 may be a UE, which can at least perform the method illustrated in FIG. 5.

As shown in FIG. 6, the apparatus 600 may include at least one receiver 602, at least one transmitter 604, at least one non-transitory computer-readable medium 606, and at least one processor 608 coupled to the at least one receiver 602, the at least one transmitter 604, and the at least one non-transitory computer-readable medium 606.

Although in FIG. 6, elements such as the at least one receiver 602, the at least one transmitter 604, the at least one non-transitory computer-readable medium 606, and the at least one processor 608 are described in the singular, the plural is contemplated unless limitation to the singular is explicitly stated. In some embodiments of the present appli-cation, the at least one receiver 602 and the at least one transmitter 604 are combined into a single device, such as a transceiver. In certain embodiments of the present applica-tion, the apparatus 600 may further include an input device, a memory, and/or other components.

In some embodiments of the present application, the at least one non-transitory computer-readable medium 606 may have stored thereon computer-executable instructions which are programmed to implement the operations of a method, for example as described in view of FIG. 5, with the at least one receiver 602, the at least one transmitter 604, and the at least one processor 608.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a remov-able disk, a CD-ROM, or any other form of storage medium known in the art. Additionally, in some aspects, the opera-tions of a method may reside as one or any combination or set of codes and/or instructions on a non-transitory com-puter-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the dis-closure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A user equipment (UE), comprising:
at least one memory; and
at least one processor coupled with the at least one memory and configured to cause the UE to:
receive configuration information in a first radio resource control (RRC) message, wherein the configuration information relates to a beam failure recovery (BFR) procedure;
receive a deactivation indication associated with a secondary node (SN) of the UE, wherein the deactivation indication is included in a second RRC message; and
in response to receiving the deactivation indication and in response to the BFR procedure for a secondary cell (SCell) having been triggered, cancel the BFR procedure for the SCell.

2. The UE of claim 1, wherein the at least one processor is configured to cause the UE to, in response to a timer associated with deactivating the SN of the UE being running:
in response to receiving the RRC message, stop the timer associated with deactivating the SN of the UE.

3. The UE of claim 1, wherein the at least one processor is configured to cause the UE to:
in response to receiving the deactivation indication and in response to the BFR procedure for a secondary cell (SCell) having been triggered, suspend a BFR MAC CE associated with the SN of the UE.

4. The UE of claim 3, wherein the at least one processor is configured to cause the UE to:
in response to the SN of the UE being in an activated state, transmitting, to a SN, a BFR MAC CE including beam information.

5. The UE of claim 1, wherein the at least one processor is configured to cause the UE to:
in response to receiving the deactivation indication and in response to the BFR procedure for a secondary cell (SCell) having been triggered, configure the SN of the UE as a deactivated state; and
transmit a BFR MAC CE for a SCell to a master node (MN) via a link between the MN and the UE, wherein a beam failure has been detected in the SCell.

6. The UE of claim 5, wherein the BFR MAC CE and a time stamp of receiving the BFR MAC CE are forwarded by the MN to a SN.

7. The UE of claim 1, wherein the at least one processor is configured to cause the UE to:
in response to receiving the deactivation indication and in response to a random access (RA) procedure on a primary secondary cell (PSCell) relating to the BFR procedure being ongoing, configure the SN of the UE as a deactivated state;
transmit, to a master node (MN), a BFR MAC CE for the PSCell via a link between the MN and the UE, wherein a beam failure has been detected in the PSCell.

8. The UE of claim 1, wherein the at least one processor is configured to cause the UE to:
in response to receiving the deactivation indication and in response to a radio access (RA) procedure on a primary secondary cell (PSCell) relating to the BFR procedure being ongoing, stop the RA procedure.

9. The UE of claim 1, wherein the at least one processor is configured to cause the UE to:
in response to receiving the deactivation indication and in response to a radio access (RA) procedure on a primary secondary cell (PSCell) relating to the BFR procedure being ongoing, skip the deactivation indication and continuing to perform the RA procedure.

10. The UE of claim 1, wherein the at least one processor is configured to cause the UE to:
in response to determining expiry of a timer associated with deactivating the SN of the UE and in response to a RA procedure on a primary secondary cell (PSCell) relating to the BFR procedure being ongoing, continue to keep the SN of the UE as an activated state and transmitting information indicating the expiry of the timer associated with deactivating the SN of the UE.

11. The UE of claim 1, wherein the at least one processor is configured to cause the UE to, in response to detecting a beam failure and in response to the SN of the UE being in a deactivated state, perform:
suspend the BFR procedure for a secondary cell (SCell);
suspend a radio access (RA) procedure on a primary secondary cell (PSCell);
configure the SN of the UE as a deactivated state;
or a combination thereof.

12. The UE of claim 1, wherein the at least one processor is configured to cause the UE to:
in response to the SN of the UE being in a deactivated state and in response to detecting a beam failure for a primary secondary cell (PSCell), a secondary cell (SCell), or a combination thereof, transmit an updated BFR MAC CE to a master node (MN) via a link between the MN and the UE.

13. The UE of claim 1, wherein the at least one processor is configured to cause the UE to:
in response to receiving the deactivation indication, set a value of a beam failure instance counter as zero and stopping a beam failure detecting timer.

14. A method performed by a user equipment (UE), comprising:
receiving configuration information in a first radio resource control (RRC) message, wherein the configuration information relates to a beam failure recovery (BFR) procedure;
receiving a deactivation indication associated with a secondary node (SN) of the UE, wherein the deactivation indication is included in a second RRC message; and
in response to receiving the deactivation indication and in response to the BFR procedure for a secondary cell (SCell) having been triggered, canceling the BFR procedure for the SCell.

15. The method of claim 14, further comprising:
in response to receiving the deactivation indication and in response to the BFR procedure for a secondary cell (SCell) having been triggered, suspending a BFR MAC CE associated with the SN of the UE.

16. The method of claim 15, further comprising:
in response to the SN of the UE being in an activated state, transmitting, to a SN, a BFR MAC CE including latest beam information.

17. The method of claim 14, further comprising:

in response to receiving the deactivation indication and in response to the BFR procedure for a secondary cell (SCell) having been triggered, configuring the SN of the UE as a deactivated state; and transmitting a BFR MAC CE for a SCell to a master node (MN) via a link between the MN and the UE, wherein a beam failure has been detected in the SCell.

18. A processor for wireless communication, comprising:

at least one controller coupled with at least one memory and configured to cause the processor to:

receive configuration information in a first radio resource control (RRC) message, wherein the configuration information relates to a beam failure recovery (BFR) procedure;

receive a deactivation indication associated with a secondary node (SN) of the processor, wherein the deactivation indication is included in a second RRC message; and in response to receiving the deactivation indication and in response to the BFR procedure for a secondary cell (SCell) having been triggered, cancel the BFR procedure for the SCell.

\*   \*   \*   \*   \*